US007125206B2

(12) United States Patent  
Turner

(10) Patent No.: US 7,125,206 B2
(45) Date of Patent: Oct. 24, 2006

(54) APPARATUS FOR MOUNTING A DRILL ON A PIPE

(76) Inventor: Gordon Henry Turner, 15 Aylesham Way, Yateley, Hampshire, GU46 6NR (GB)

( * ) Notice: Subject to any disclaimer, the term of this patent is extended or adjusted under 35 U.S.C. 154(b) by 0 days.

(21) Appl. No.: 10/890,616

(22) Filed: Jul. 14, 2004

(65) Prior Publication Data

US 2005/0025596 A1 Feb. 3, 2005

(30) Foreign Application Priority Data

Jul. 4, 2003 (GB) ................................. 0316445.6

(51) Int. Cl.
*B23B 41/08* (2006.01)
(52) U.S. Cl. ..................... 408/92; 408/103; 408/234
(58) Field of Classification Search ................ 408/92, 408/88, 103, 104, 108, 110, 234; 137/318; 269/130, 131, 132, 265, 268, 270
See application file for complete search history.

(56) References Cited

U.S. PATENT DOCUMENTS

| 309,085 | A |   | 12/1884 | Payne |   |
|---|---|---|---|---|---|
| 436,609 | A |   | 9/1890 | Mueller |   |
| 515,976 | A | * | 3/1894 | Smith | .................. 137/15.14 |
| 2,024,390 | A |   | 12/1935 | Ruesch |   |
| 3,090,260 | A | * | 5/1963 | Brooks et al. | ................. 408/92 |
| 3,293,952 | A | * | 12/1966 | Fairbanks | ................. 408/1 R |
| 3,710,427 | A |   | 1/1973 | Doty |   |
| 3,741,670 | A |   | 6/1973 | Wood |   |
| 3,762,829 | A |   | 10/1973 | Yilmaz |   |
| 3,779,272 | A | * | 12/1973 | Dunmire | ................. 137/315.01 |
| 3,847,501 | A | * | 11/1974 | Doty | ................. 408/108 |
| 3,922,107 | A |   | 11/1975 | Fowler |   |
| 4,105,358 | A | * | 8/1978 | Walker | ................. 408/108 |
| 4,390,309 | A |   | 6/1983 | Fangmann |   |
| 4,533,284 | A |   | 8/1985 | Agius |   |
| 4,936,720 | A |   | 6/1990 | Dolatowski |   |
| 5,051,044 | A |   | 9/1991 | Allen |   |
| 5,713,702 | A |   | 2/1998 | Turner |   |
| 5,919,009 | A |   | 7/1999 | Stephenson |   |
| 6,050,753 | A |   | 4/2000 | Turner |   |
| 6,761,511 | B1 | * | 7/2004 | Turner | ................. 408/92 |
| 6,902,201 | B1 | * | 6/2005 | Helle et al. | ................. 285/197 |
| 2005/0042050 | A1 | * | 2/2005 | Turner | ................. 408/234 |

FOREIGN PATENT DOCUMENTS

| DE | 150703 |   | 9/1981 |
|---|---|---|---|
| EP | 1088619 |   | 4/2001 |
| EP | 1498227 A1 | * | 1/2005 |
| JP | 124503 |   | 7/1984 |
| WO | WO 98/16353 |   | 4/1998 |
| WO | WO 3011534 A1 | * | 2/2003 |

* cited by examiner

*Primary Examiner*—Daniel W. Howell
*Assistant Examiner*—Ali Abdelwahed
(74) *Attorney, Agent, or Firm*—Jackson Walker, LLP

(57) ABSTRACT

A platform for a drill is supported on four support members which are pivotable on the platform to alter the angle between opposite members. In one embodiment a stop limits the movement of the support members so that the maximum angle between them can be controlled to suit the diameter of a pipe on which the apparatus is mounted. In another embodiment, the support members are attached by connecting rods to a cross member which is raised and lowered on a threaded rod to pivot the members.

12 Claims, 18 Drawing Sheets

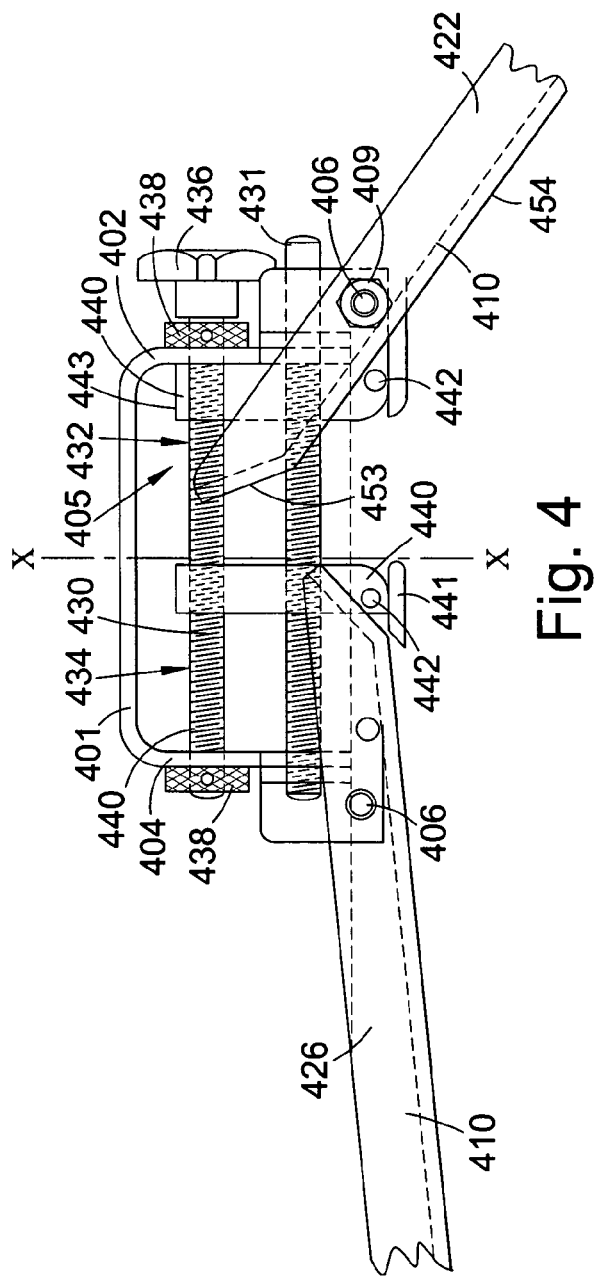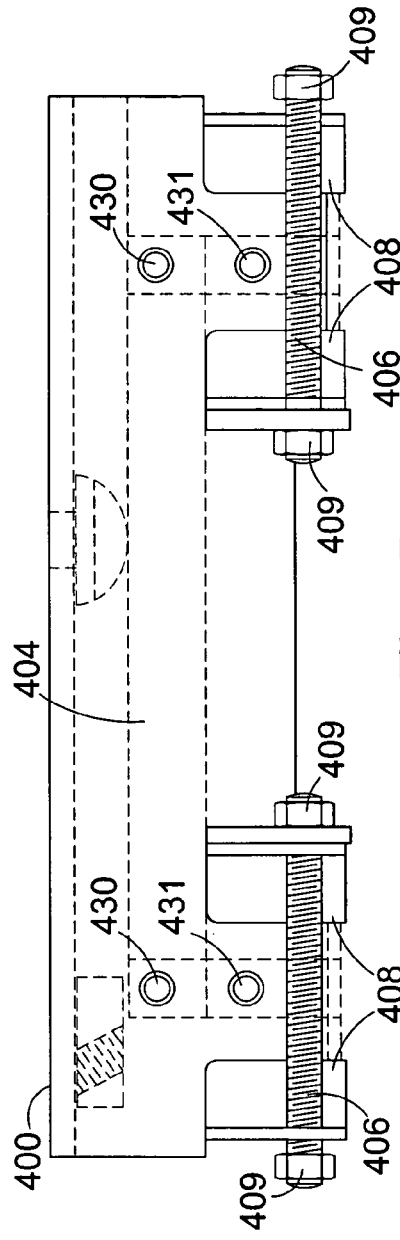

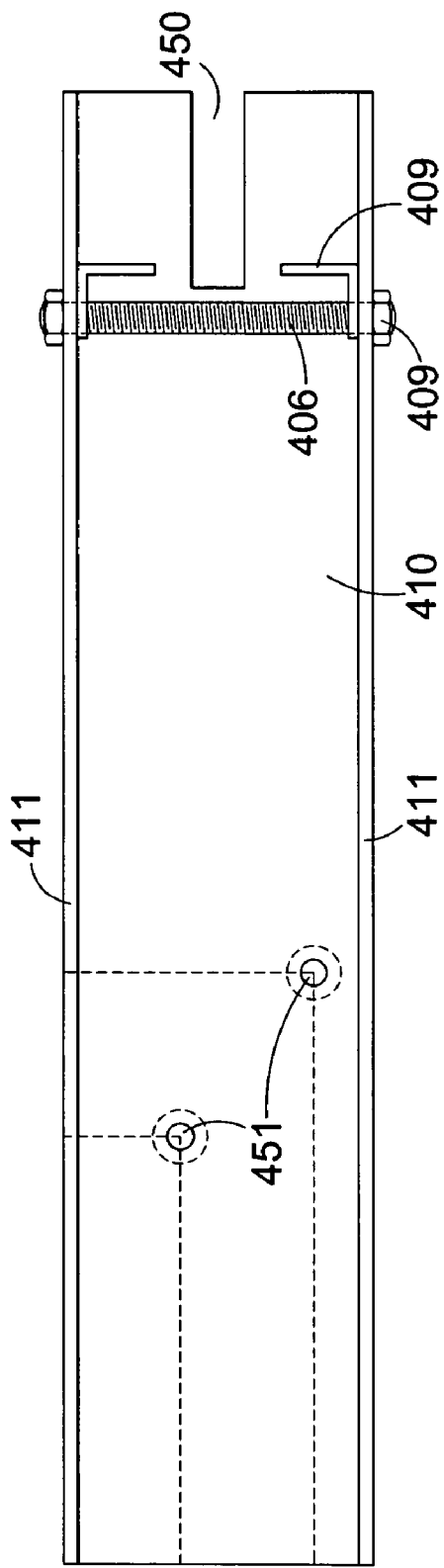
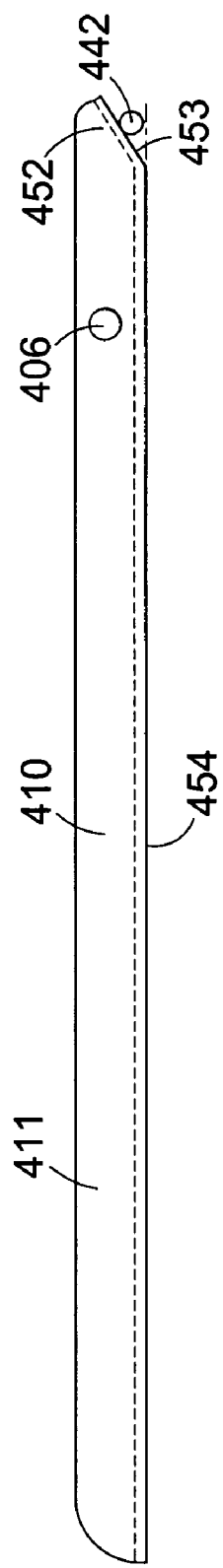
Fig. 6a
Fig. 6b

APPARATUS FOR MOUNTING A DRILL ON A PIPE

This invention relates to an apparatus for mounting a drill on a pipe, and in particular to an apparatus adapted to cope with pipes of both small and large diameter.

One known method of holding a drill steadily against a pipe is using a magnetic system. This would include, for example, an electromagnetic holder, which when energised, holds a drill firmly against a metallic pipe, so that a hole may be drilled in a defined position in the pipe. However, a magnetic holder suffers from several major problems. It cannot be used with pipes made from a non-magnetic material, such as concrete, plastic, stainless steel, brass or clay. It cannot be used in environments which are particularly sensitive to electrical or magnetic fields, such as radar installations or computer factories. A separate safety chain has to be used as well, because in the event of a power failure to the electromagnetic clamp, care needs to be taken to ensure that the entire apparatus does not fall and injure operators who may be standing nearby. Also, magnetic mountings cannot withstand large forces without becoming dislodged.

WO98/16353 discloses an apparatus for mounting a drill onto a pipe, in which a frame is clamped onto the pipe, and a drill press is adjustably mounted on the platform. The drill press stand can be adjusted relative to the platform, in a direction parallel to the axis of the pipe to be drilled, and the pipe may be drilled radially. By allowing the drill press stand to be adjusted relative to the platform, a more flexible arrangement is possible. One embodiment involves using a clamp which fits around the pipe, constructed from a front plate and a back plate held together by a series of screws. In a second embodiment, the clamping means is an inverted V-shape frame which sits on top of the pipe, and is connected at both sides to a chain which loops around the pipe. The chain can be tightened against the frame to fix the clamp in position. This is done by means of adjustable tension units which are fixed to the frame, and have chain holding hooks. The hooks can be raised or lowered relative to the frame, to tighten or loosen the chain.

The frame with the chain in WO98/16353 is more suitable than a simple rigid clamp for use in restricted space, due to the flexibility and relatively small volume of the chain. However, it is not readily suited for drilling into pipes of very large diameter. One problem is that the tension units pull the chain tight in a direction perpendicular to the platform. This works well for small pipes where the diameter of the pipe is not much larger than the width of the platform. However, for large pipes with diameter much larger than the width of the platform, the part of the chain which attaches to the tension units lies almost parallel to the surface of the pipe. Thus when the hook in the tension unit is raised to tighten the chain, it mainly has the effect of lifting up the end of the chain, rather than tightening it, and the amount by which the chain can be tightened is very small.

A second problem is that for large pipes, only a small part of the circumference of the pipe is encompassed within the inverted V shape of the platform. The platform is therefore likely to slip or become dislodged after it has been positioned. The chain would be unlikely to clamp tightly enough with such an arrangement, which would be a particular problem for a large pipe made from a hard material, such as a steel pipe of 70 cm diameter or more which had to have large holes drilled in situ. The chain might jump off the hook during drilling.

Although these problems might be eliminated by simply scaling the whole clamp to a very much larger size, the apparatus would then be unsuitable for smaller pipes, and extremely unwieldy.

WO03/011534 describes a system of extension plates for mounting a frame to a pipe, to carry a drill stand, and discusses the problem of mounting on pipes which are not fully excavated. It also addresses the problem of mounting a drill stand on a structured wall pipe which has a corrugated outer surface. A frame is described, comprising a platform for a drill stand, a pair of support members which are presented to the pipe, and a clamp having a pair of clamp members which, in use, extend into one or more grooves of the pipe. Means are provided for urging the clamp members against walls of the groove(s), thereby gripping the pipe. Axial extension members are also described, which extend from the frame, axially of the pipe, to inhibit rocking of the frame on the pipe.

The present invention provides apparatus for mounting a drill stand on a pipe, comprising a platform for the drill stand, means for attaching the platform to the pipe, and a pair of support members which in use are presented to the pipe to support the platform on the pipe, the support members being pivotably mounted on the platform to define a variable angle between the support members, wherein variable limiting means is provided to set said variable angle at a maximum value.

The support members form an inverted V shaped support, in which the angle of the inverted V in which the pipe rests is adjustable in order to accommodate pipes of different diameter. Thus, the apparatus can be adjusted so that the support members rest tangentially on the pipe to improve stability. An additional benefit of this arrangement is that as the angle of the inverted V shape is increased the drilling apparatus will be lowered to be closer to the pipe, which will also contribute to the stability of the apparatus in use.

The weight of the platform carried by the support members will tend to cause the members to splay outwards when the apparatus rests on a pipe, and so we have found that it is not necessary to control the support members so that they are forcibly moved outwards to increase the angle between them, however means may be provided for positively moving the members outward if desired.

In one embodiment the apparatus may comprise a pillar housing for receiving the pillar of the drill press stand. The pillar housing or drill press stand may be mounted on the platform by bolts extending through elongate holes in the platform to allow the drill press stand to be slidably adjusted relative to the platform.

In one embodiment the apparatus comprises a platform, a drill press stand on the platform, the platform having a pair of support members which, in use, may be presented to the pipe and define between them an angle, wherein the pair of support members are pivotably mounted on opposite sides of the platform and means is provided for adjusting the angle between the support members.

Additional support members may be added to the apparatus. For example, a pair of support members may be mounted on each side of the platform.

The support members may be pivotally mounted on the platform to pivot, in use, about an axis generally parallel to the axis of a pipe on which the apparatus is mounted.

An adjustable stop may be provided to limit movement of a support member in a direction increasing the angle between opposed support members. The stop may be provided by a slider which is driven by a threaded spindle to decrease the angle between support members on opposite sides of the platform. The threaded spindle may be both left and right handed and stops for a pair of opposed support members are mounted on opposite portions of the threaded spindle to move, in use, in opposite directions. A gearing system, such as gearwheels, a belt, or a chain, may be used to co-ordinate the rotation of a plurality of spindles.

There is increasing use of large diameter structured wall pipes which have a corrugated outer surface. Although these pipes are double skinned, many local bye laws prohibit penetration of the outer skin. This, coupled with the difficulty of excavating around a large diameter pipe, poses a particular problem.

One embodiment of the invention comprises a clamp member for gripping the walls of corrugations on the pipe surface, to hold the frame in place on the pipe surface.

The clamp member may be pivotally mounted on a support member to pivot about an axis generally parallel to the pipe axis. The clamp member, in use, may be orientable along a radius of the pipe. A threaded member or a cam may be provided to bias a clamp member against a groove wall.

Another embodiment may comprise an attaching member such as a chain which may encircle the pipe, the attaching member is adjustable by a tension member to grip the pipe. The means for adjusting the tension member may comprise a screw threaded detent which attaches to the chain and is pivotally mounted on the support members to pivot about an axis generally parallel to the pipe axis.

A means for mounting the drill press stand on the platform may be provided, which allows the position of the drill press stand to be adjusted relative to the platform, such that the relative adjustment between the drill press stand and the platform is in a direction parallel to the axis of the pipe to be drilled, whereby the pipe may be drilled radially.

Other aspects and preferred features of the invention will be apparent from the following description and the accompanying claims.

The present invention will now be described by way of example only and with reference to the accompanying drawings, in which:

FIG. 4 shows an end view of the first embodiment of the apparatus and shows the support members in different orientations.

FIG. 5 shows a side view of the first embodiment of the apparatus.

FIG. 6a shows a top view of a support member and FIG. 6b shows a side view of a support member.

Figure 1:
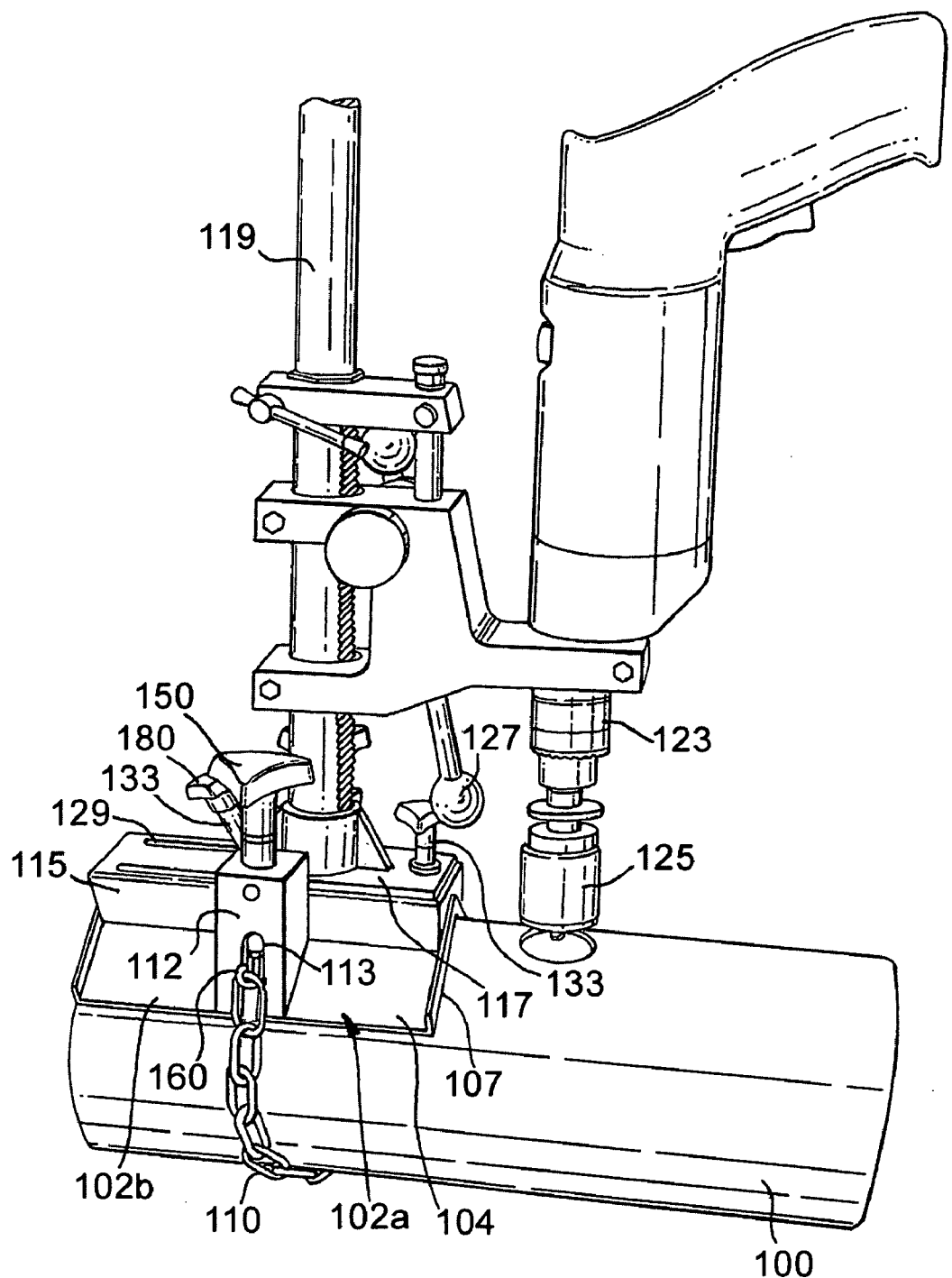
FIG. 1 shows a prior art apparatus for mounting a drill stand on a pipe.

FIG. 1 shows a prior art clamp unit of the type seen in WO98/16353 fitted to a pipe 100 of moderately large diameter. The clamp unit comprises an inverted V-shape frame 102 which is two halves 102a, 102b, which is placed against the pipe 100. A chain 110, formed from a plurality of metal links loops around the pipe. The chain 110 is pulled tight to clamp the frame on the pipe 100. The chain 110 connects to the frame 102 by means of two tension units 112, one of which bridges between the respective arms 104, 106. Each tension unit 112 engages the chain 110 by means of a movable hook 160. The hook 160 can be moved towards the surface of the pipe 100, to loosen the chain, or moved away from the surface of the pipe, to tighten the chain. The particular chain link which engages with the hook may be selected according to the size of the pipe. The hook protrudes through a slot in the side of each tension unit 112, and the top 113 of the slot limits adjustment of the chain 110. A platform 115 for a drill stand is mounted on top of the frame 102. The drill press stand is mounted onto the platform, and it can be adjusted in position relative to the platform in a direction parallel to the axis of the pipe. The pipe may be drilled radially.

The frame halves 102a, 102b, housings of the tension units 112 and the platform 115 are welded together.

As described more fully in WO98/16353, the V-shape frame 102 may be formed to have side flanges 107 which provide extra strength for it. The V-shape frame 102 may be formed integrally with the platform 115. A casting 117 receives a pillar 119 of a drill press stand. A drill, including a chuck 123 and a borer 125 mounted in the chuck, may be mounted on the drill press stand. It will be understood that by rotation of the drill press stand handle 127, the drill may be advanced towards or away from the pipe. In this way therefore the borer 125 may be brought selectively into contact with the pipe.

The casting 117 is mounted onto the frame 102 by means of elongate mounting holes 129 formed in the platform 115 and corresponding mounting holes formed in the casting 117. Bolts 133 pass through the holes in order to rigidly clamp (via nuts) the casting 117 to the frame 115. This allows the accurate alignment of the drill to be used with the pipe. The bolts are adjustable by rotatable handwheels 180.

Each side portion 104, 106 of the frame 102 carries a tension unit 112. Each tension unit comprises a turret, within which is housed a screw-threaded member which may be rotated manually by a rotatable handwheel 150. Rotation of the handwheels causes the screw thread to rotate and thereby selectively move a detent up or down, in this example the detent being a metal hook 160. The ends of the chain 110 may be placed over the hooks 160 of the tension units 112, and thereby the tension in the chain may be adjusted for clamping the frame 102 to the pipe. It will be apparent that only one of the hooks 160 needs to be adjustable.

When the drilling operation has been finished and it is desired to remove the frame 102 from the pipe then this is simply a matter of the user releasing the tension in the chain sufficiently for the chain to be removed from a hook 160.

Figure 2:
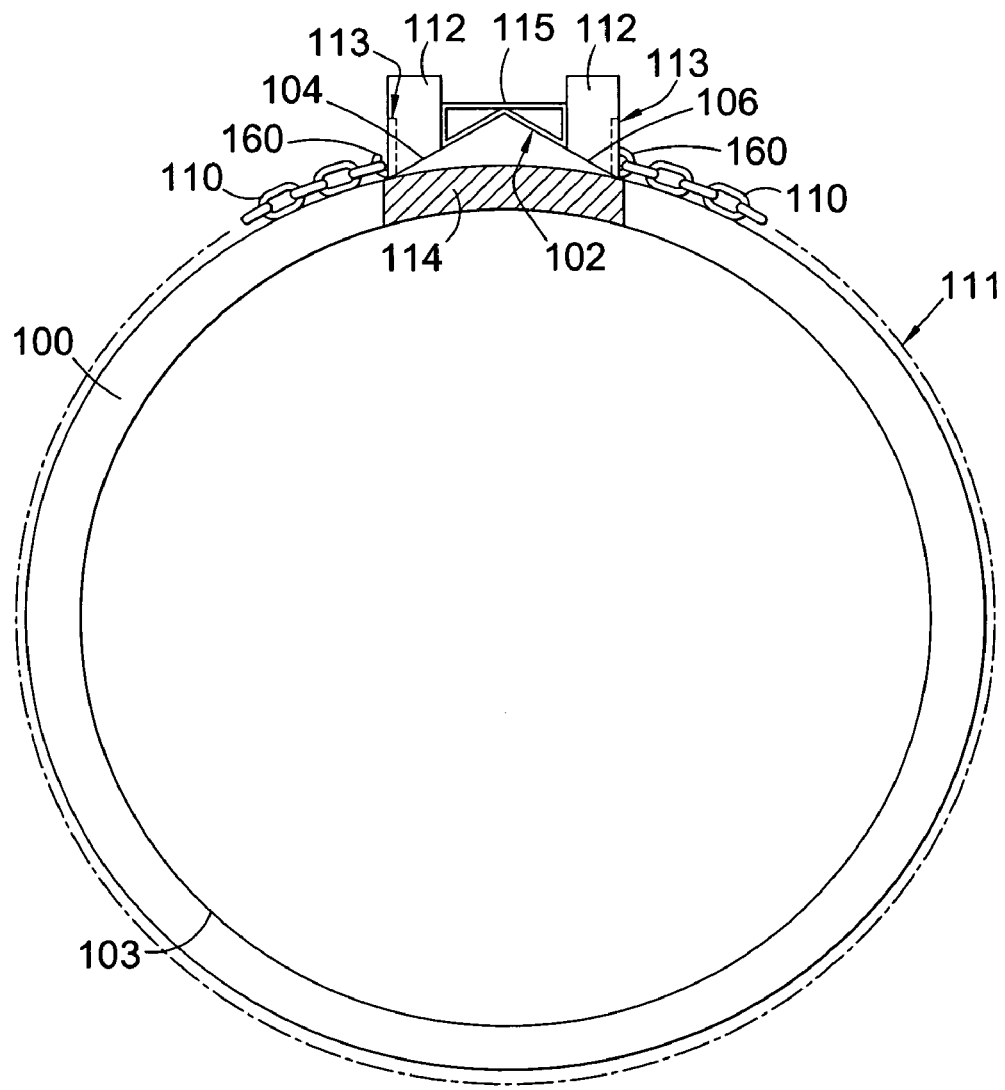
FIG. 2 shows a cross sectional view through a large diameter pipe with the frame of FIG. 1 mounted on it.

However, this arrangement for mounting the frame 102 on the pipe works best with a small diameter pipe. As seen in FIG. 2, for a pipe of large diameter the inverted V-shape frame lies against an almost flat region of the pipe surface. This results in a number of drawbacks tending to reduce the stability of the apparatus. The chain meets the tension unit almost horizontally, so if the position of the hook 160 is adjusted to attempt to tighten the chain, it tends to simply lift the end of the chain off the surface of the pipe, which does not sufficiently tighten the chain. Also, the frame 102 is likely to slip, as and there is little force pulling the frame onto the pipe surface and it meets the pipe surface at the end edge of the support members.

In WO03/011534 I provide a system of extension plates for extending the arms of the V-shaped frame 102 in order to accommodate pipes of larger diameter. However this results in the tension members being further from the pipe surface, and so they must be relocated onto the extension members, and also the drill press stand itself is radially further away from the pipe.

Figure 3:
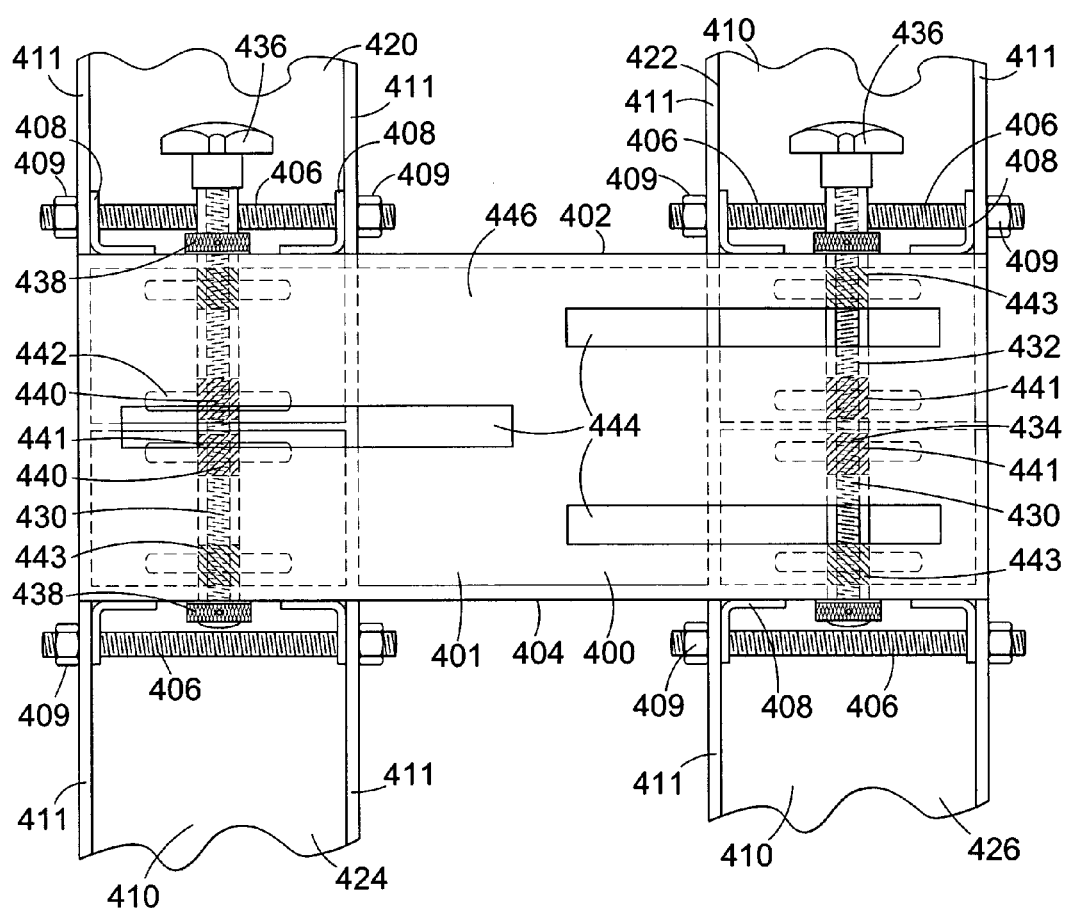
FIG. 3 shows a top view of the first embodiment of the apparatus with two support members on each side.

FIG. 3 shows a top view of a first embodiment of the present invention. A platform 400 is provided, having a flat rectangular upper surface 401, and two sidewalls 402, 404 extending perpendicularly downwards from opposite edges of the upper surface. The upper surface together with the sidewalls form an inverted "U" shaped channel along the underside of the platform. The upper surface has three parallel elongate slots 444 for mounting a drill press stand onto the platform 400, in a manner similar to that described in FIGS. 1 and 2.

Four support members 420, 422, 424, 426 are pivotally mounted on the platform 400. These support members are, in effect, a substitute for the V-shaped frame 102 of FIG. 1. Two of these support members 420 and 422 are pivotally mounted on one sidewall 402 of the platform 400. The other two support members 424 and 426 are pivotally mounted on the opposite sidewall 404 of the platform, and aligned with the support members 420, 422 on the first sidewall 402.

Each support member 420, 422, 424, 426 is pivotally mounted on a spindle or bolt 406 which is carried in a pair of supporting brackets 408 attached to the lower part of the sidewalls 402 and 404 of the platform 400. The brackets are right-angled brackets which are welded to the platform side portions 402 and 404. The brackets extend below the lower edge of the side walls 402, 404 to carry the bolt 406 below the side walls.

Each support member is in the from of a generally elongate flat plate 410 with a flange 411 along each elongate edge, and each flange 411 is provided with a hole for receiving the bolt 406 to pivotably mount the support member on the supporting brackets 408, each bolt 406 extending through the holes in the flanges 411 of a support member and the holes in the pair of supporting brackets 408. Each bolt 406 is secured in position with a pair of nuts 409. The nuts 409 may be tightened to urge the flanges against the brackets 408 and so contribute to retaining the support members in the required orientation in use as will be explained later. When the nuts 409 are loose the support members may pivot freely about the bolts 406.

A means for controlling the angle between the opposed support members 420, 424; 422, 426 will now be described.

Two threaded spindles 430 are mounted on the platform 400, each protruding through holes provided in each of the sidewalls 402 and 404 and extending below the upper surface 401 of the platform 400. The spindles are positioned between respective pairs of supporting brackets 408.

A portion of each threaded spindle 430 is threaded with a left-hand thread 432 and the remainder of the threaded spindle is threaded with a right-hand thread 434. A rotatable handwheel 436 is fixed to one end of each threaded spindle 430. The spindles rotate freely in the side walls 402, 404 and the position of each threaded spindle 430 on the platform 400 is maintained by a pair of knurled nuts 438, each knurled nut 438 being positioned adjacent to the outer sidewalls 402 and 404 of the platform 400. The position of the knurled nuts 438 along each threaded spindles 430 can be adjusted to adjust the position of each threaded spindle 430 within the platform 400, as will be explained later with reference to FIG. 4.

FIG. 4 is a side view of FIG. 3 and shows two opposing support members in different orientations. It is not intended that in normal use the support members would have such orientations as in order to drill a radial hole the support members should be positioned symmetrically about the line XX. The support members are illustrated in FIG. 4 in this way to demonstrate the different orientations that can be achieved corresponding to the different positions of the respective sliders 440.

Two sliders 440 are threadedly located on each threaded spindle 430, one slider 440 is located on the left-hand thread portion 432 of the threaded spindle 430 and the other slider 440 is located on the right-hand thread portion 434 of the threaded spindle 430. When a handwheel 436 is rotated, the threaded spindle 430 rotates and the sliders 440 move in opposite directions along the length of the threaded spindle. Each slider 440 is guided within a slot 450 (see FIG. 6a) in the internal end of its corresponding support member 420, 422, 424, 426, the slots 450 being marginally wider than the sliders 440. A peg 442 is attached to the lower part of each slider 440 (see FIG. 4), and protrudes either side of the slider 440. The height of the peg 442 on each slider 440 is such that the peg 442 is located beneath its corresponding support member.

The support members are pivotally mounted on the respective bolts 406, and the inner ends 452 of the support members are located within the cavity 405 of the inverted U-shape platform 400. The inner end portion 453 the plate 410 of the support members is angled upwards. The sliders 440 move along the threaded spindle 430 as it is rotated by the handwheel 436. The peg 442 is attached to the lower portion of each slider 440 and is located below its corresponding support member 420, 422, 424, 426.

The handwheel 436 can be turned so that the sliders 440 move along the threaded spindle 430 towards each other to the middle of the platform cavity 405 as indicated by the position of the left hand slider 440 in FIG. 4. When the sliders 440 are in this position, the support members can rotate to their maximum opening as shown by the left hand support member 426, the support member 426 being prevented from rotating further clockwise by the end surface 453 bearing on the peg 442.

The handwheel 436 can also be turned so that the sliders 440 move along the threaded spindle 430, away from each other to the edge of the platform cavity 405 as indicated by the position of the right hand slider 440 in FIG. 4. When the sliders 440 are in this position, the support members are forced to rotate to their minimum opening as shown by the right hand support member 422, the support member 422 being prevented from rotating further anti-clockwise by underside of the plate 410 engaging the peg 442.

The handwheel 436 can, of course, be turned so that the sliders 440 move along the threaded spindle 430 to an intermediate position so that the support members are open at an intermediate opening. Larger pipes require larger openings. Thus, the angle between opposite support members can be adjusted to maximise the stability of the apparatus on pipes of different diameter and to position the platform 400 close to the pipe surface. When the desired angle is achieved, the nuts 409 can be tightened to help maintain the orientation of the support members 420, 422, 424, 426 if the device is lifted away from the pipe.

The knurled nuts 438 are used to position spindles so that the adjacent support members are parallel, and the opposed support members are angled symmetrically about the line XX. The knurled nuts 438 are adjusted to adjust the position of the threaded spindle 430 to adjust the position of the sliders 440 to ensure that the sliders are located symmetrically about the line XX. A grub screw may be provided to lock the nuts 438 in position.

In order to help stabilise the sliders 440 an additional bar 431 is provided. This bar 431 is positioned parallel to the threaded spindle 430 and may be a smooth bar fixed between the platform side portions 402 and 404 and passing through corresponding holes in the sliders 440. The bar 431 may be located below the threaded spindle 430, as in FIG. 4, or above it, i.e. the position of the threaded spindle 430 and bar 431 may be transposed.

FIG. 5 shows a side view of the platform 400 looking towards sidewall 404. The support members and handwheels 436 are not shown in this view.

FIG. 6a shows a top view of a support member. This view shows the slot 450 in the inner end of the support member within which the slider 440 moves. Mounting holes 451 are provided, for mounting clamping members to the support member.

FIG. 6b shows a side view of a support member. The end surface 453 of the support member is angled upwards at the inner end 452 so that when the support members are fully open the peg 442 will run along this angled surface 453. This will ensure that when the apparatus is used on larger pipes and when opposing support members are fully open, the peg 442 will not protrude beyond the lower surface 454 of the support member to disturb the apparatus from resting stably on the pipe.

Figure 7:
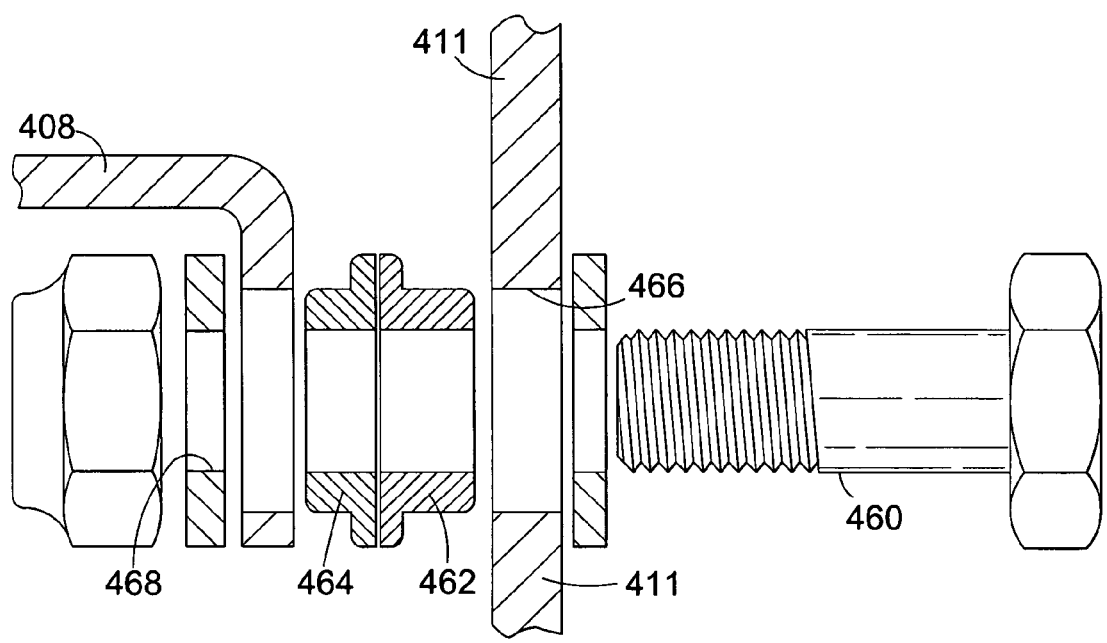
FIG. 7 shows a cross sectional view of an alternative means of mounting the support members.

As an alternative to using a long pivot bolt 406 for each support member, as shown in FIGS. 3 to 5, two short bolts 460 may be used instead, as shown in FIG. 7. The two short bolts may be individually adjusted. Bushes 462, 464 may be inserted into each of the holes 466, 468 in the support member flange 411 and bracket 408, to prevent undue wear on the flanges 411 and brackets 408. The bushes may be press fitted or glued into the holes, and are a good fit to the bolt 460.

Figure 8:
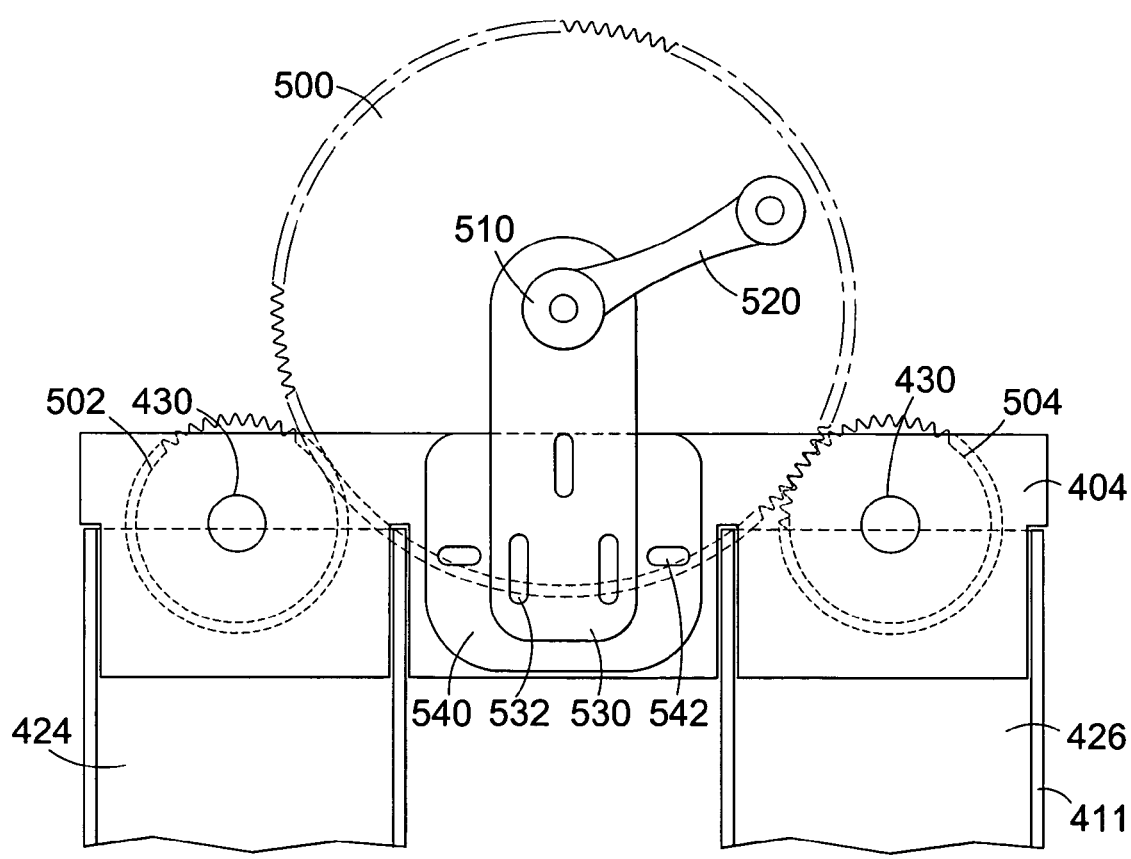
FIG. 8 shows a front view of a gearwheel system for use in the first embodiment of the invention.

To ensure that the four sliders 440 move in a co-ordinated fashion, so that both pairs of support members 420, 424; 422, 426 will move in a synchronised manner, a gearing system may be provided as illustrated in FIG. 8. The gearing system allows one common handwheel to simultaneously rotate both threaded spindles 430, hence altering the positions of all four sliders 440. By ensuring that the pairs of support members move together, the gearing system provides the advantage that the platform remains parallel to the pipeline and square on to the circumference. It will also speed up the adjustment of the device. A gearing of between 1.5:1 and 3:1 is preferable.

FIG. 8 shows an embodiment having a set of gear wheels to synchronise the rotation of the two threaded spindles 430. The two spindles 430 each have a gearwheel 502, 504 attached, with the spindle 430 running perpendicularly through the centre of the gearwheel. The gearwheels 502, 504 may be attached to the threaded spindles by means of bushes, which may be press fitted or glued to the spindles, or attached to the spindles by grub screws, as well known in the art.

Both gearwheels 502, 504 are of the same size, with a set of teeth on their outer edge. A central jockey wheel 500 is provided, which is larger than each of the gearwheels 502, 504, and which also has a set of teeth on its outer edge. The larger size of the jockey wheel 500 reduces the number of rotations required of the jockey wheel to produce a given number of rotations of the threaded spindles. This makes it quicker to adjust the positions of the sliders 440 from one extreme position to the other.

The jockey wheel 500 is positioned so that its teeth engage with the teeth of each of the gearwheels 502, 504. The jockey wheel 500 is mounted onto a main drive shaft 510, which is held in position by sets of supporting brackets 530, 540 mounted half way along the platform 400 on the side walls 402, 404. A set of brackets comprises a horizontal adjustment bracket 540 and a vertical adjustment bracket 530. The adjustment brackets provide the advantage of raising the height of the main drive shaft 510 above the platform 400, allowing a larger size of jockey wheel 500 to clear the pipe.

Figure 9:
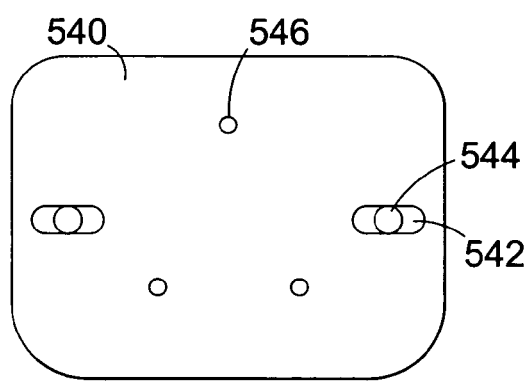
FIG. 9 shows a front view of the horizontally adjustable mounting plate of FIG. 8.
Figure 10:
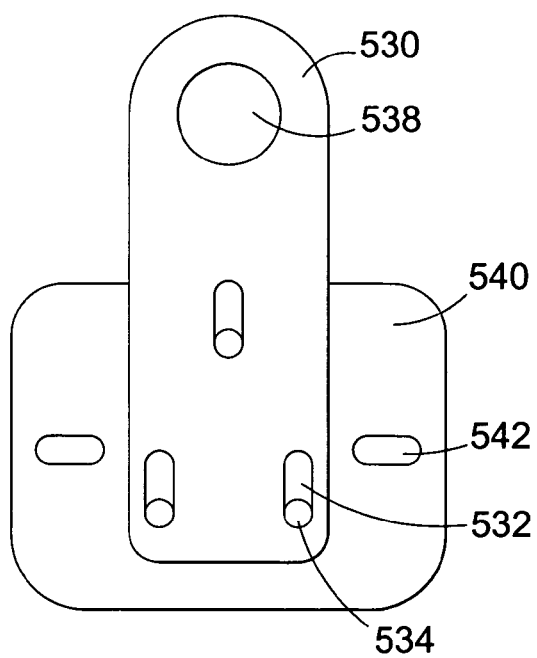
FIG. 10 shows a front view of the vertically adjustable mounting plate mounted onto the horizontally adjustable mounting plate of FIG. 8.

As shown in FIGS. 9 and 10, each of the adjustment plates 530, 540 has three elongated slots 532, 542 through which a screw 534, 544 may be inserted. The plate may be moved along the length of the slot to adjust its position. The screw may then be tightened to hold the plate in place. The vertical ajustment plate 530 is mounted in front of the horizontal adjustment 540 plate by short screws 534 that do not protrude beyond the thickness of the horizontal adjustment plate 540. The horizontal adjustment plate 540 is mounted to the platform.

Figure 11:
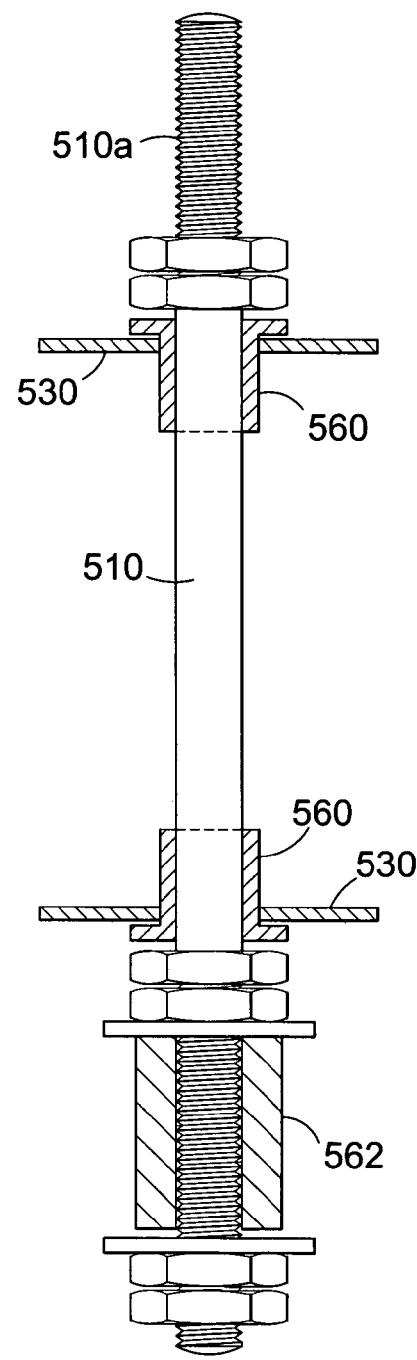
FIG. 11 shows a top view of the main drive shaft of FIG. 8.

FIG. 11 shows the main drive shaft 510 of FIG. 8 which extends above the platform 400. Bushes 560 on the main drive shaft 510 act as bearings for the drive shaft, and are a press-fit or are glued into the adjustable plates 530. The lateral positions of the bushes may be varied by washers between half nuts or collars of bushes. An additional length of thread is provided at the handle end 510a of the shaft 510 to position the handle further out, and keep the operators fingers clear of the support members when the support members subtend their maximum angle, which is preferably about 170 degrees. The jockey wheel is mounted on a bush 562 to rotate with the shaft 510.

Figure 12A:
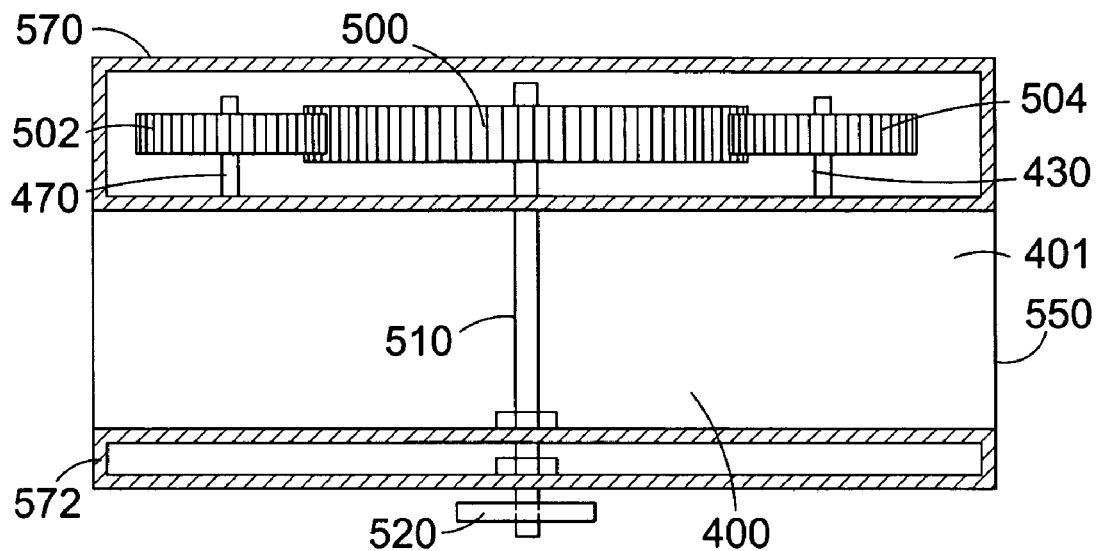
FIG. 12A shows a top view of the gearwheel system of the first embodiment when mounted inside a safety guard.
Figure 12B:
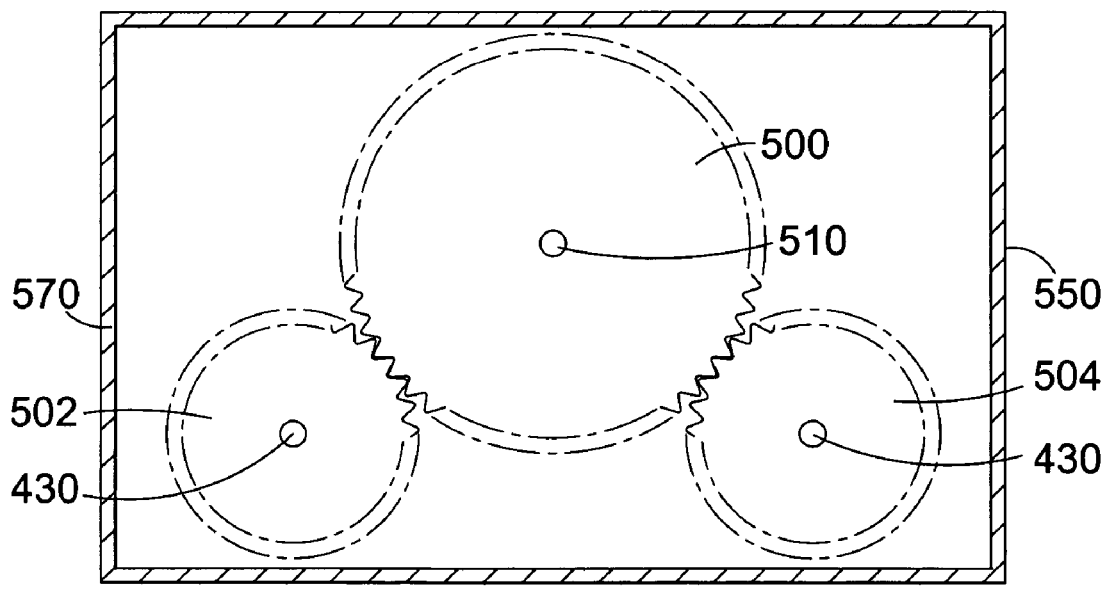
FIG. 12B shows a cross sectional view through the gears of FIG. 12A.

Safety guards 570, 572 for the gear wheels 502, 504 and jockey wheel 500 are shown in FIG. 12A. The safety guards are generally rectangular, box shaped with a flat top and sides, to allow the machine to be set on its side or completely upside down, resting on the guards. This makes it easier to set the machine in a secure position for access to the internal parts, and also facilitates adjustment when that is made off the pipe. FIG. 12B shows a cross sectional view through the gears shown in FIG. 12A.

In an embodiment which attaches to a pipe using a chain hooked onto two adjustable tension units, the angle at which the chain meets the tension units is dependent on the angle to which the support members are set. It is thus preferable for the tension units to be self adjusting tension units, as disclosed in WO03/011534.

Figure 13:
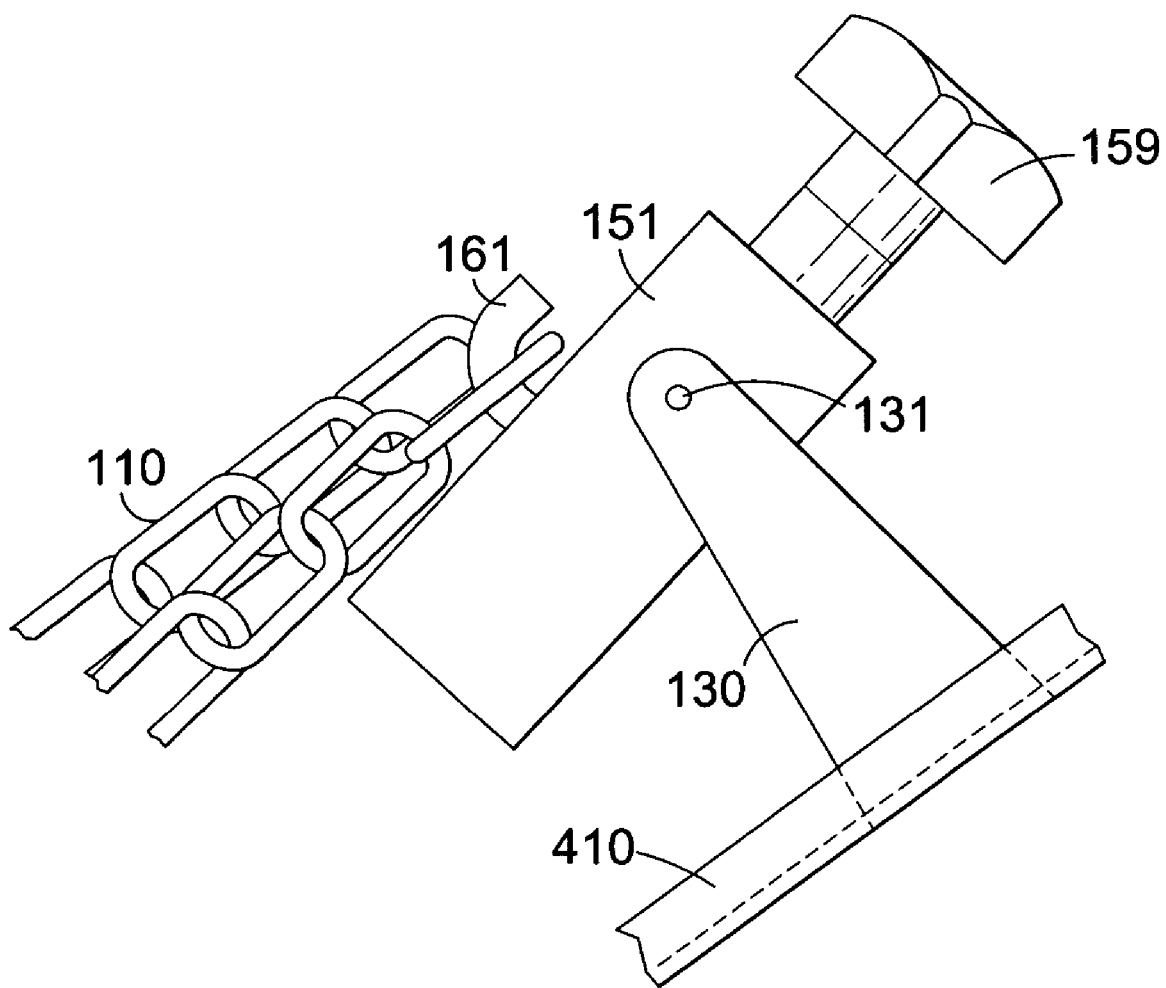
FIG. 13 shows a pivotally mounted tension unit mounted on a support member to facilitate attaching the apparatus to a pipe with a chain.

FIG. 13 shows a pivotally mounted tension unit 151 mounted between a pair of support member 420, 422; 424, 426 by means of a pair of brackets 130. A chain 110 is hooked onto a detent 161 on the tension unit 151 and passes around the pipe to a similar arrangement mounted on a support member on the opposite side of the platform 400. The tension unit 151 may pivot around an axis 131, thus allowing the angle at which the tension unit 151 aligns with the chain 110 to self-adjust when the handwheel 159 is rotated to tighten the chain 110 so that a tensioning screw inside the tension unit 151 is aligned with the end of the chain 110. This is described in WO 03/011534.

Figure 14:
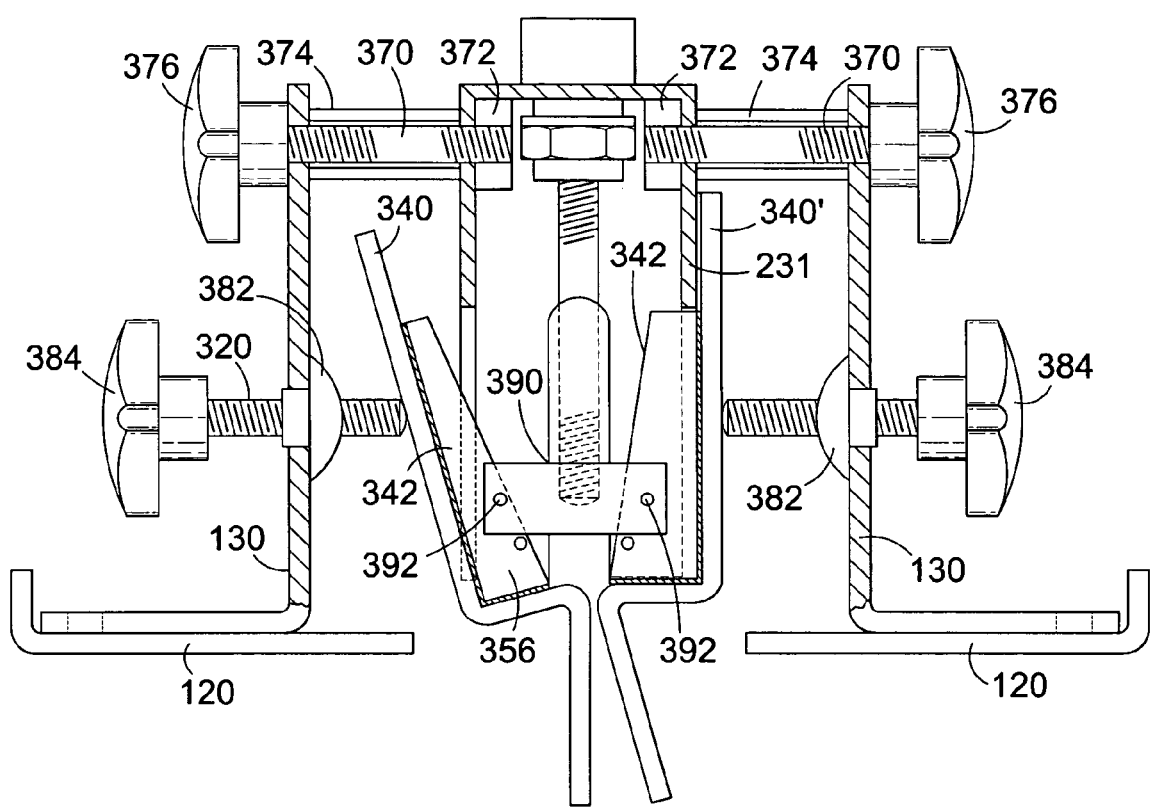
FIG. 14 shows an embodiment of a clamping member, partially cut away, for clamping on to the outer skin of a structured wall pipe.

FIG. 14 illustrates a clamp member for holding the apparatus on a structured wall pipe having a corrugated outer surface. Such clamp members are described in WO 03/0111534 which is incorporated herein by way of reference. Plastic pipes having a smooth inner wall and a corrugated outer wall or skin are known. The corrugations, forming a series of ridges and grooves, run circumferentially around the pipe. In many applications, the outer skin should not be pierced. With large diameter pipes set into the ground, it may not be feasible or desirable to excavate to a depth below the pipe, and so a chain or other stop, cannot be used.

Thus I provide a gripping or clamp member which, in use, extends into a circumferential channel of the outer skin of the pipe to grip the wall of the channel. The legs of the clamp member may be urged apart to force them against opposite walls of the channel, thereby gripping the pipe. In another embodiment the clamp members extend into adjacent grooves and are urged together to grip the walls of the ridge separating the grooves. A member may be twisted about the radial axis of the pipe, so as to engage opposite walls of a groove and form a wedging action, but a clamping action is preferred.

The clamp members are mounted on a tension unit 151. It is preferable that the clamp members extend as far as possible into the respective groove(s). The clamp members should preferably grip on the relatively flat region of the groove wall just above the arcuate base of the groove. Preferably they are oriented along a radius of the pipe. The position of the tension member 151 relative to the contact point between the pipe outer wall and the support members depends on the pipe diameter and the angle of the support embers. Thus, the clamp plates are pivotally mounted with the tension unit 151, between the support brackets 130. In this way they can be oriented along the pipe radius before being tightened against the groove walls.

The dimensions of the ridges and grooves have been found to vary considerably between pipe manufactures and pipe sizes. Thus, in some cases only a relatively narrow groove is provided, with a relatively wide ridge.

One such clamp arrangement is shown in FIG. 14. The box section 231 pivots on threaded shafts 370 which screw into plates 372 within the box section 231. A spacer 374 surrounds shaft 370 between the box section wall and the bracket 130, and the unit is tightened by handwheels 376 fixed on the ends of the shafts 370. Threaded studs 380 are threadedly mounted in captive nuts 382 the brackets 130 and turned by handwheels 384 to bear on the clamp members 340. The box section 231 pivots about shafts 370 to align the clamp members with the pipe radius, and the clamp members 340 must be sufficiently wide for the studs 380 to bear on the clamp members at different pivot angles. The webs 342 are sandwiched between a pair of plates 390 and pivot on pins 392 in apertures 394. The pins may be moved to a second position in the webs or the plates 390 to provide a different range of movement for the clamp members In the embodiment of FIGS. 15 to 17, the support member s are pivotally mounted on the platform and are movable between a plurality of predetermined positions to fix the support members at one of a preset number of angles.

Figure 15:
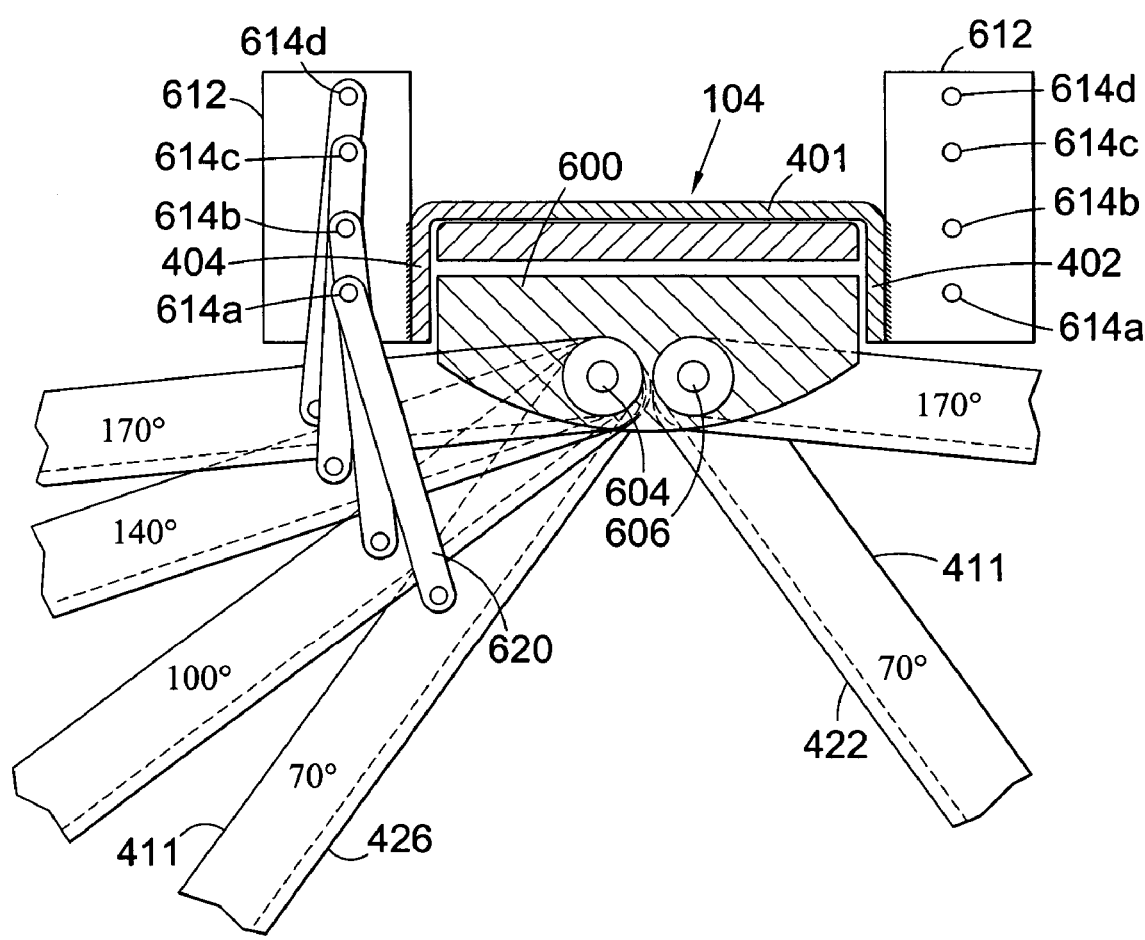
FIG. 15 shows an end view of a second embodiment of the invention.
Figure 17:
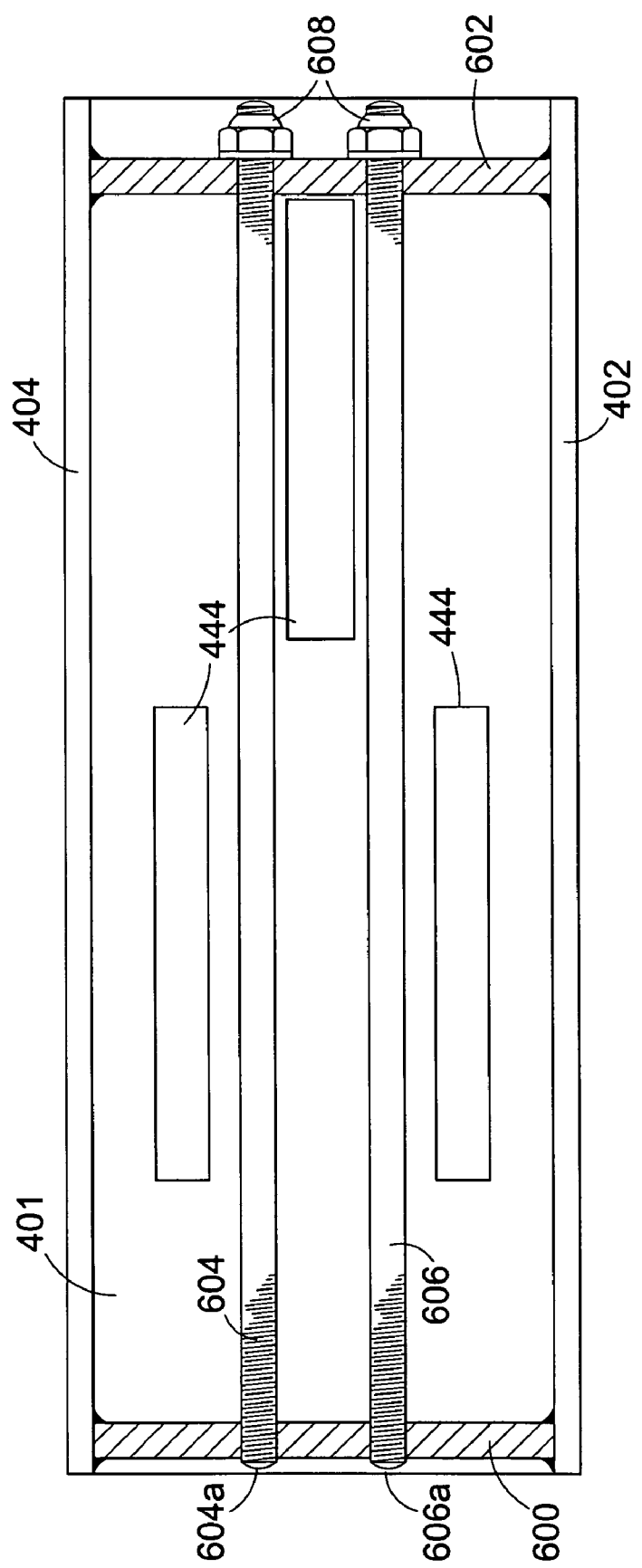
FIG. 17 shows an underneath view of part of the embodiment of FIG. 17.

Referring to FIGS. 15 and 17, the platform 104 has two end plates 600, 602 welded in position between sidewalls 402, 404 below the upper surface 401. The support members 420, 422, 424, 426 are pivotally mounted on spindles 604, 606 which are screwed at one end 604a, 606a in end plate 600 and extend through end plate 602 to be locked in position by nuts 608. Referring to FIG. 17, which shows the underside of the platform with the support members removed, this shows the slots 444 for mounting the drill press stand.

Figure 16:
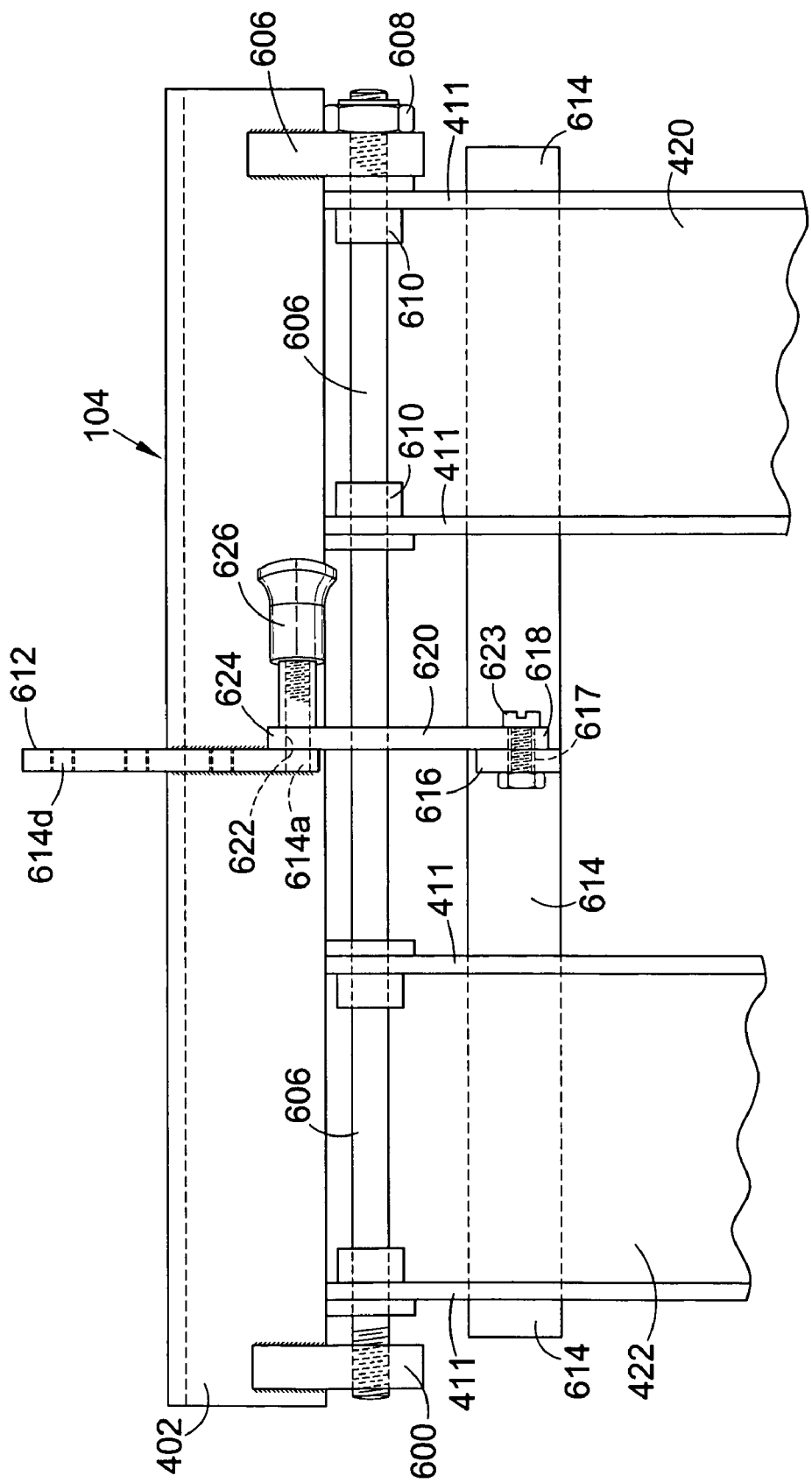
FIG. 16 shows a side view of the embodiment of FIG. 15.

Referring to FIG. 16, each pair of adjacent members 420, 422, 424, 426 is mounted on a respective spindle 604, 606 via bushes 610 mounted in the sidewalls 411 of the support members 420, 422, 424, 426. For clarity, FIG. 16 shows the plates extending generally downwards A plate 612 is welded to each side wall 402, 404 about mid way along the side wall. Plates 612 have threaded apertures 614a, b, c, d.

The adjacent support members 420, 422; 424, 426 are joined by a cross beam 614 which extends beneath the support members and is screwed or welded in place so that the support members of a pair move in unison. Cross beams 614 have an upstanding lug 616 having an aperture 617. A lower end 618 of a rigid metal strap 620 is pivotally attached to lug 616 by a nut and bolt 623, for example. The upper end 624 has an aperture 622. A threaded stud 626 passes through aperture 622 and screws into a chosen aperture 614a, b, c or d in plate 612. The strap 620 thus holds the support members in a fixed angular position on platform 104.

It can be seen that the straps 620 can be fixed in one of four positions, giving four predetermined angles (assuming the pairs of support members are held at symmetrical positions). On the left hand side of FIG. 15, the support member 426 is shown in each of the four positions, on the right hand side member 422 is shown in only two of the possible positions. It will be appreciated that a greater number of angles can be provided for by providing an appropriate apertures in plates 614. In the illustrated example, the angles between the pairs of plates are selected to be 70, 100, 140 and 170 degrees, but other angles may be provided for.

In place of or as well as providing a plurality of apertures 614a, b, c, d, the effective length of a strap may be varied by changing the strap or providing a plurality of apertures 622 along the strap length.

Figure 18:
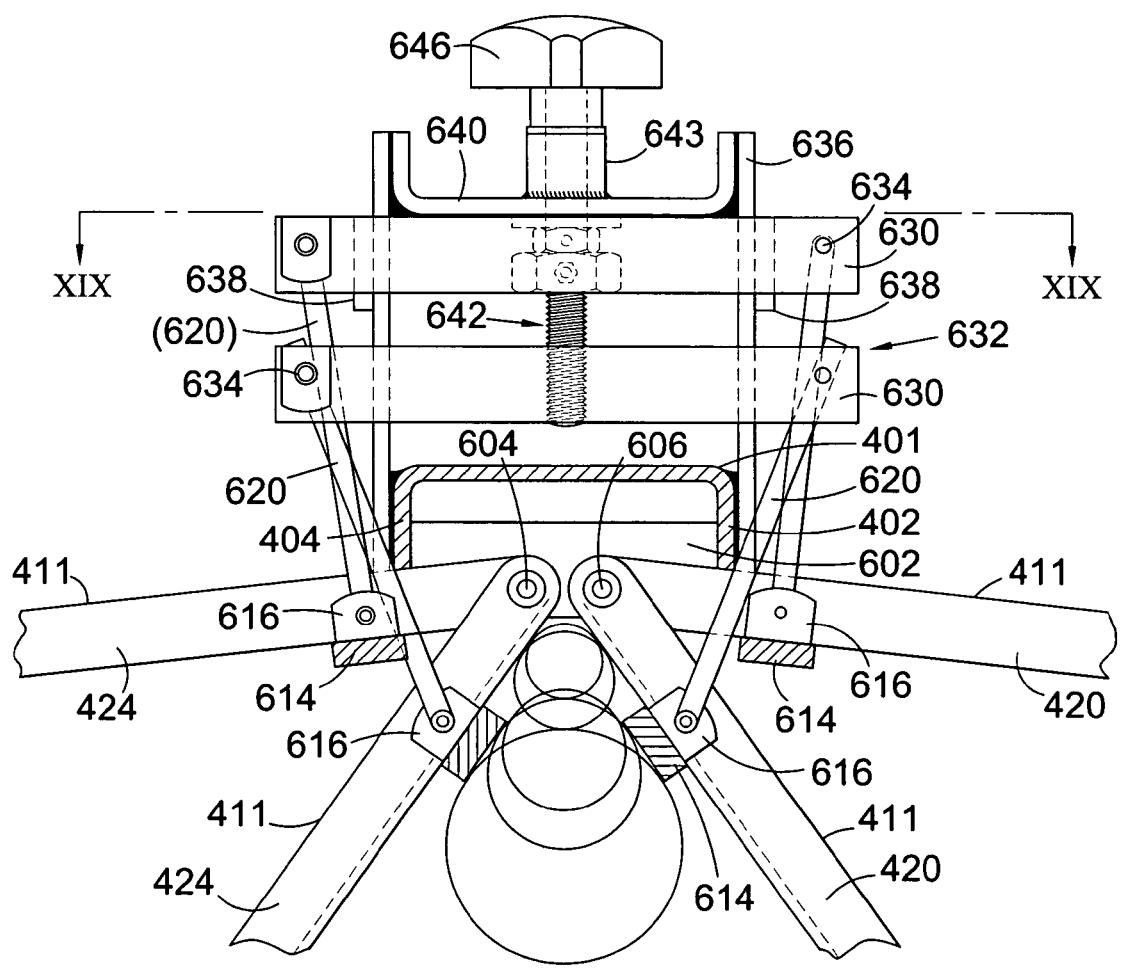
FIG. 18 shows a view of a modification of the embodiment of FIGS. 15 to 17, along line XVIII—XVIII of FIG. 19.
Figure 19:
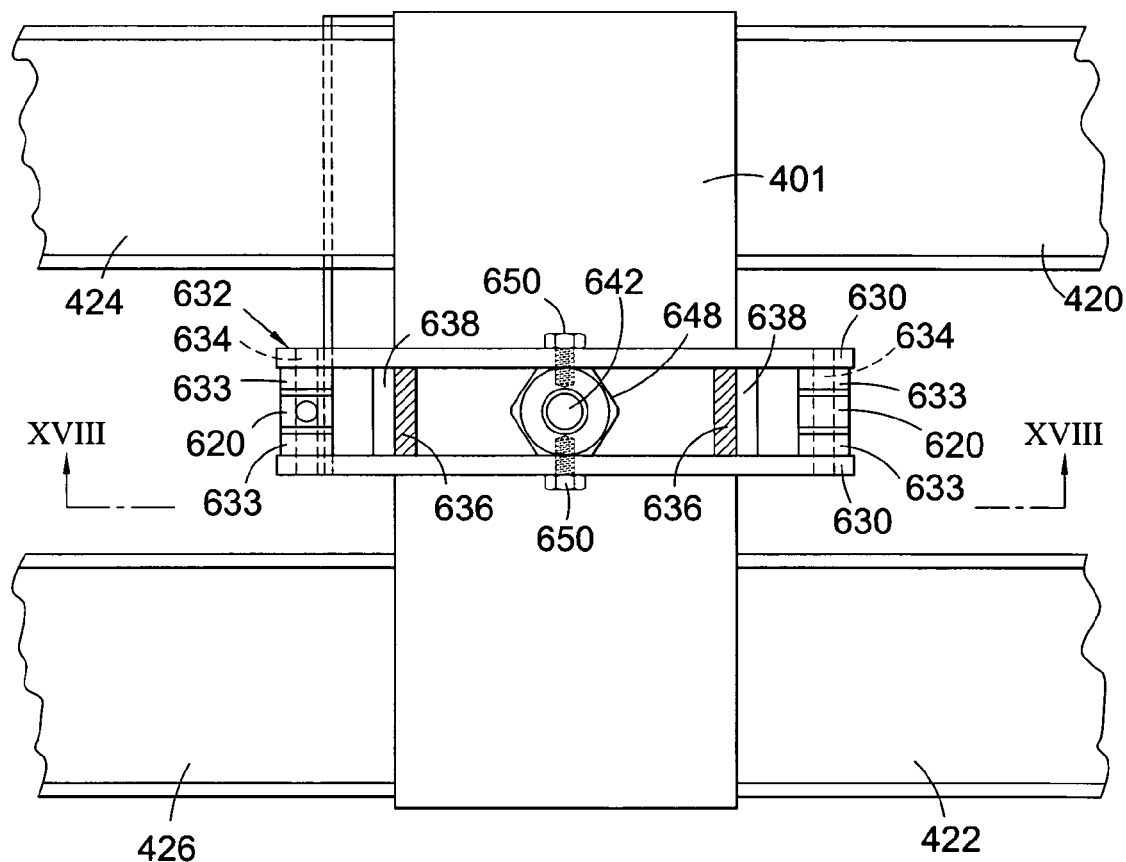
FIG. 19 is a view of the modification of FIG. 18 along line XIX—XIX of FIG. 18.

In the embodiment of FIGS. 18 and 19, the strap or connecting rod 620 is attached at its upper end to a threadedly mounted cross member which is raised and lowered on the platform 104 to adjust the angle between the support members. This adjustment means allows the angle to be varied through a continuous range.

FIG. 18 is a side view taken along the line XVIII—XVIII of FIG. 19. The support members 420, 424 are shown in two positions. The straps 620 are pivotally connected at their lower ends to respective pairs of support members 420, 422; 424, 426 via cross beams 614 and lugs 616 as before. The upper ends of the straps 620 are sandwiched between two cross plates 630 forming a cross member 632. Straps 620 are pivotably mounted on spindles 634 extending between the cross plates 630. Spacers 633 position the strap end centrally between the cross members 630.

As cross member 632 is raised, and lowered, the straps 620 are raised and lowered to pivot the support members. The support members run either side of two uprights 636 welded to the oppresite side walls 402, 404 and are a snug fit around the uprights, to reduce movement axially along the platform (perpendicular to the plane of the drawing in FIG. 18). Also, two guide blocks 638 are pinned between the cross plates 630, to prevent lateral or sideways movement across the platform. Thus the cross member is constrained to move vertically, that is in a direction perpendicular to the upper surface 401 of the platform 104, by the uprights 636.

Uprights 636 support a cross beam 640. A threaded rod 642 is rotatably mounted in a collar 643 mounted on cross beam 604 and held against vertical movement relative to the cross beam by a nut 644 fixed in place on the rod 642 below the cross beam 640 and a handwheel 648 fixed in place on the upper end of the rod 642.

Cross member 632 is threadedly mounted on rod 642 by means of a nut 648 which is pinned between the cross plates 630 by screws 650. Thus, rotation of rod 642 by means of handwheel 646 causes the nut 648 to travel up or down the rod and so raise the cross member 632 and in turn pivot the support members 420, 422, 424 and 426 upwards and downwards.

Figure 20:
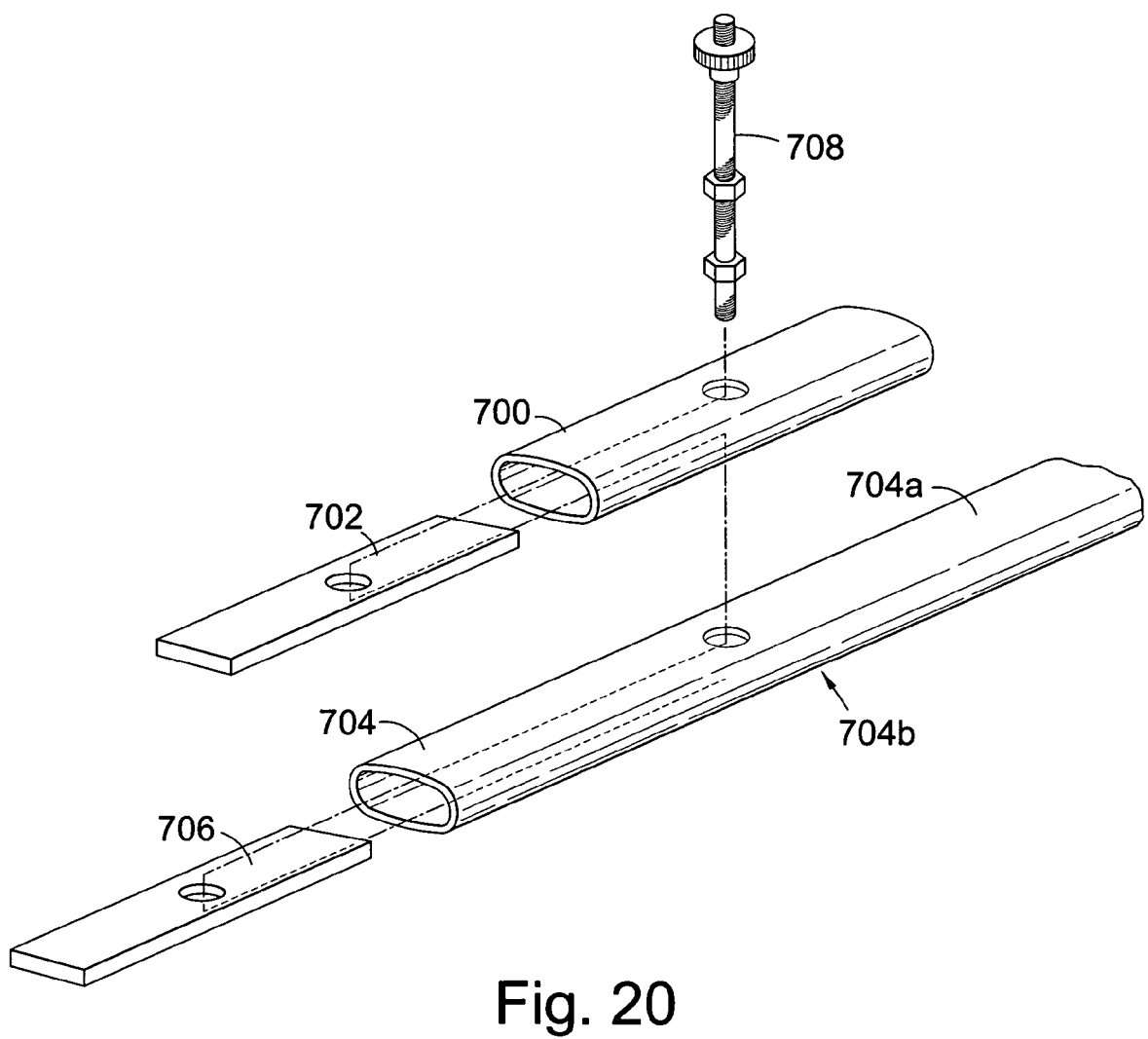
FIG. 20 is a perspective view of straps for attaching to a support member to stabilise the apparatus.

In WO03/011534 I describe the use of straps which are attached to the support members and extend axially along the pipe to stabilise the platform. It is important that any surface bearing on the pipe does not cut into the pipe surface. Thus, in a preferred form of stabiliser for the platform I use oval cross section tube as shown in FIG. 20. A first shorter tube portion rests against the underside of a support member, a second longer tube section is connected between the support members and extends axially beyond them.

Referring to FIG. 20, the upper, short tube length 700 has an inner reinforcing plate 402 along its length to prevent crushing of the tube. A mounting stud 708 extends through the support member, through tube 700 and into tube 704. It may be threadedly mounted in the upper wall 704*a* of the tube 704, or in an insert 706. The stud 708 does not penetrate the bottom wall 704*b* of tube 704. The stabilising members are attached to the support members by tightening 708.

Figure 21:
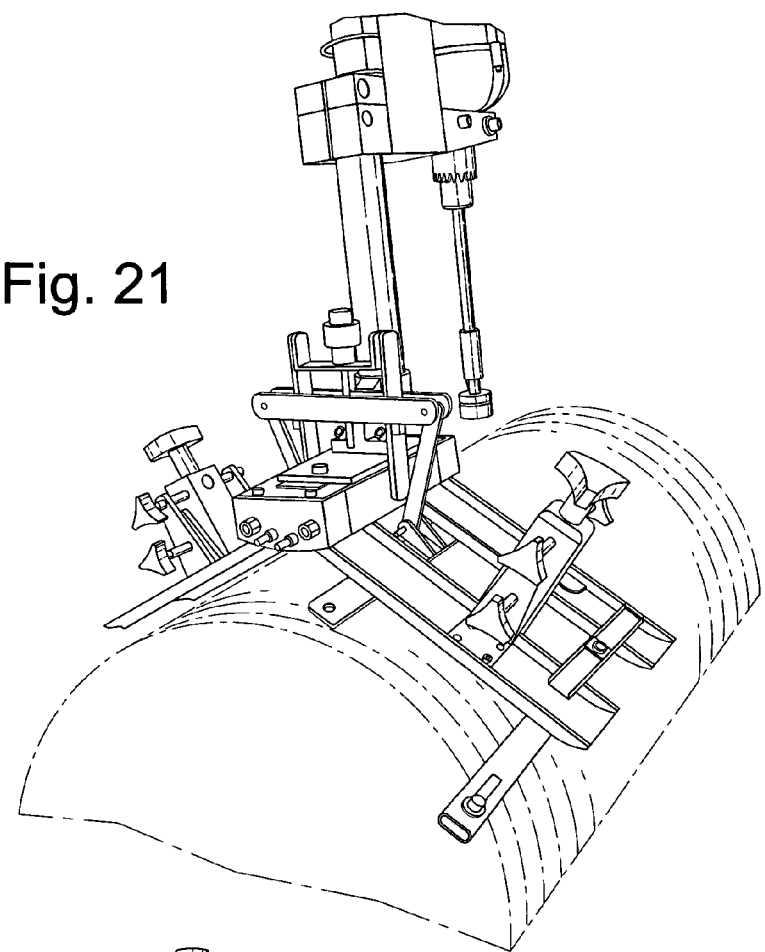
FIG. 21 is a a perspective view of the embodiment of FIGS. 18 and 19, mounted on a pipe.
Figure 22:
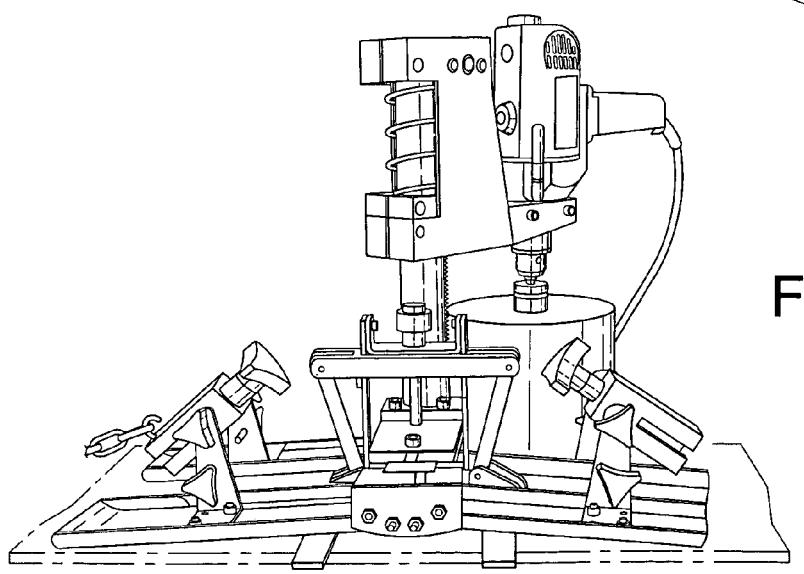
FIG. 22 is a view of the embodiment of FIGS. 18 and 19 mounted on a flat surface.

FIG. 21 shows the device of FIGS. 18 and 19 mounted on a structured wall pipe. FIG. 22 shows the device on a flat surface.

Other modifications will be apparent to those in the art.

The invention claimed is:

1. Apparatus for mounting a drill stand on a pipe, comprising a platform for the drill stand and a pair of support members which in use are presented to the pipe to support the platform on the pipe, the support members being pivotably mounted on the platform to straddle a pipe and to define a variable angle between the support members, wherein variable limiting apparatus is provided to set said variable angle at a maximum value, said variable limiting apparatus comprises a stop for limiting the range of motion of the support members in a direction increasing the angle between them, said stop comprises a slider on a threaded spindle, and said stop is movable by rotation of the spindle and slidably mounted on a support rod, said support rod being parallel to said threaded spindle.

2. Apparatus as claimed in claim 1, wherein each of said support members is pivotable about an axis which is parallel, in use, to the pipe axis.

3. Apparatus as claimed in claim 2, wherein said variable limiting apparatus is configured to simultaneously adjust said support members so that said support members are symmetrically arranged.

4. Apparatus as claimed in claim 1, wherein the threaded spindle has both left-hand and right-hand threaded portions, and wherein said stop comprises two sliders mounted on the two said portions to move, in use, in opposite directions, each slider restricting the movement of a respective one of the pair of support members.

5. Apparatus as claimed in claim 4, wherein the threads on said left hand and right hand portions have identical pitch.

6. Apparatus as claimed in claim 1, comprising two pairs of support members, a first pair of support members being mounted to a first side of the platform, and a second pair of support members being mounted to the opposite side of the platform, wherein the support members of a pair are coupled together to align them within the same plane.

7. Apparatus as claimed in claim 1, comprising means for attaching the apparatus to a pipe, the attaching means comprising a clamp which, in use, extends into a respective groove, and means for urging the clamp against a wall of the groove, thereby gripping the pipe.

8. Apparatus as claimed in claim 1, comprising means for attaching the apparatus to a pipe, the attaching means comprises a hook which is pivotally mounted to said apparatus and a chain for engaging with said hook.

9. Apparatus for mounting a drill on a pipe, comprising a platform and a pair of support members which in use are presented to the pipe to support the platform on the pipe, means for pivotably mounting the support members on the platform to straddle a pipe in use and to define an angle between the support members, wherein a means is provided to hold the support members in one of a plurality of positions to define the angle between the support members, the means for holding the support members comprises a rigid strap connected between a support member and the platform, wherein the strap is connected at one end to a support member and at the other end to one of a plurality of positions on the platform.

10. Apparatus as claimed in claim 9, wherein the strap is connected at one end to a support member and at the other end to the platform by adjustment means for holding the other end of the strap in one of a plurality of continuous positions.

11. Apparatus as claimed in claim 10, wherein the adjustment means comprises a member which is coupled to the platform by a threaded rod, and the height of the member relative to the platform is adjusted by rotating the rod.

12. Apparatus for mounting a drill stand on a pipe, comprising a platform for the drill stand, a pair of support members, the support members being pivotally mounted on the platform so as to define an angle between the support members, the support members, in use, resting on the pipe to straddle it, wherein the support members are each pivotally mounted at one end to the platform, straps are attached at a first end to a respective support member and at a second end to an adjuster provided on the platform, the adjuster being adjustable to raise and lower the second ends of the straps to adjust the angle between the support members.

\* \* \* \* \*